May 18, 1926. 1,585,596
A. C. MENGES
COMBINED ELEVATOR AND TURNTABLE FOR VEHICLES
Filed Sept. 30, 1925 2 Sheets-Sheet 1
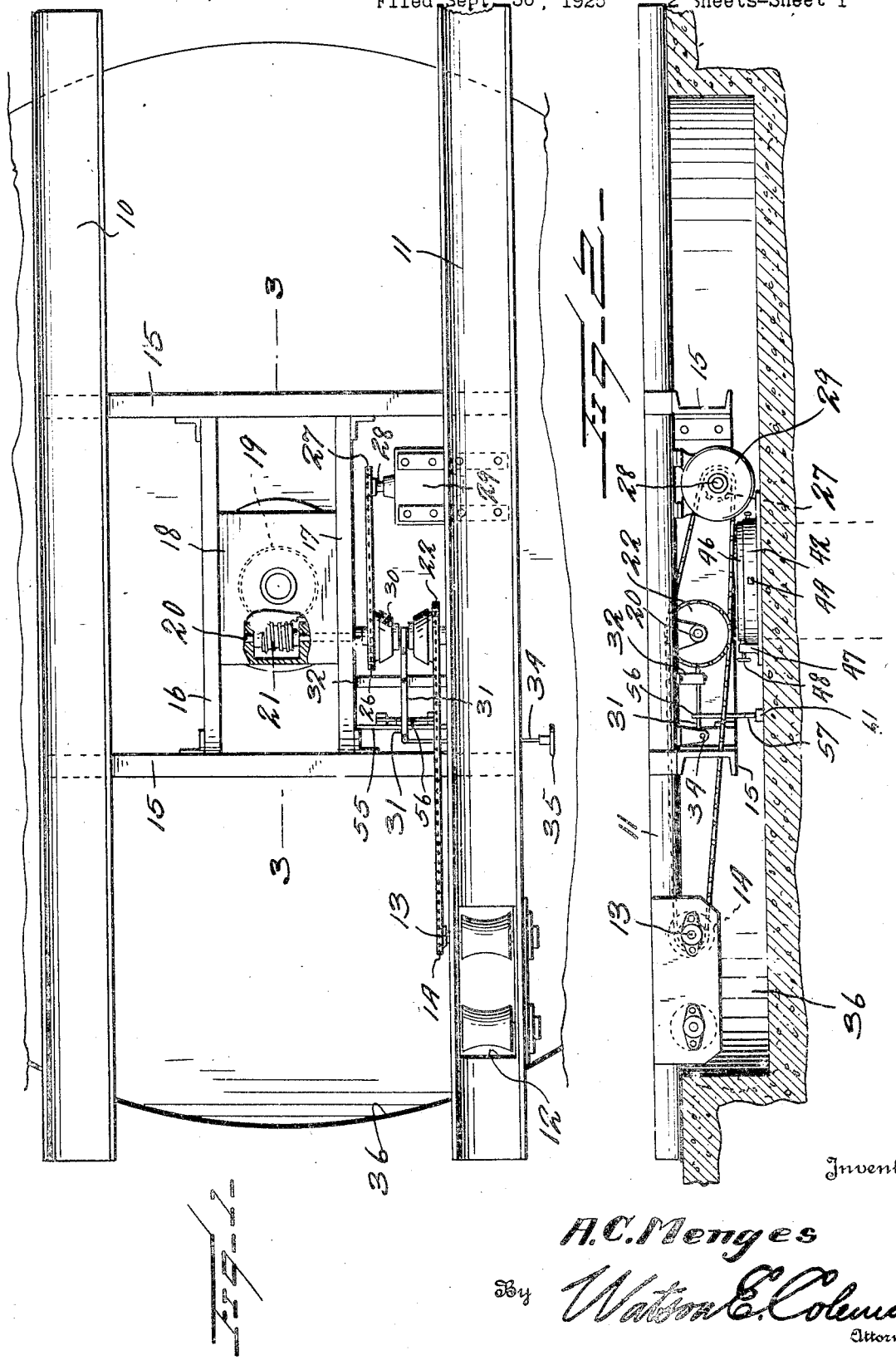
Inventor
A.C.Menges
By Watson E. Coleman
Attorney

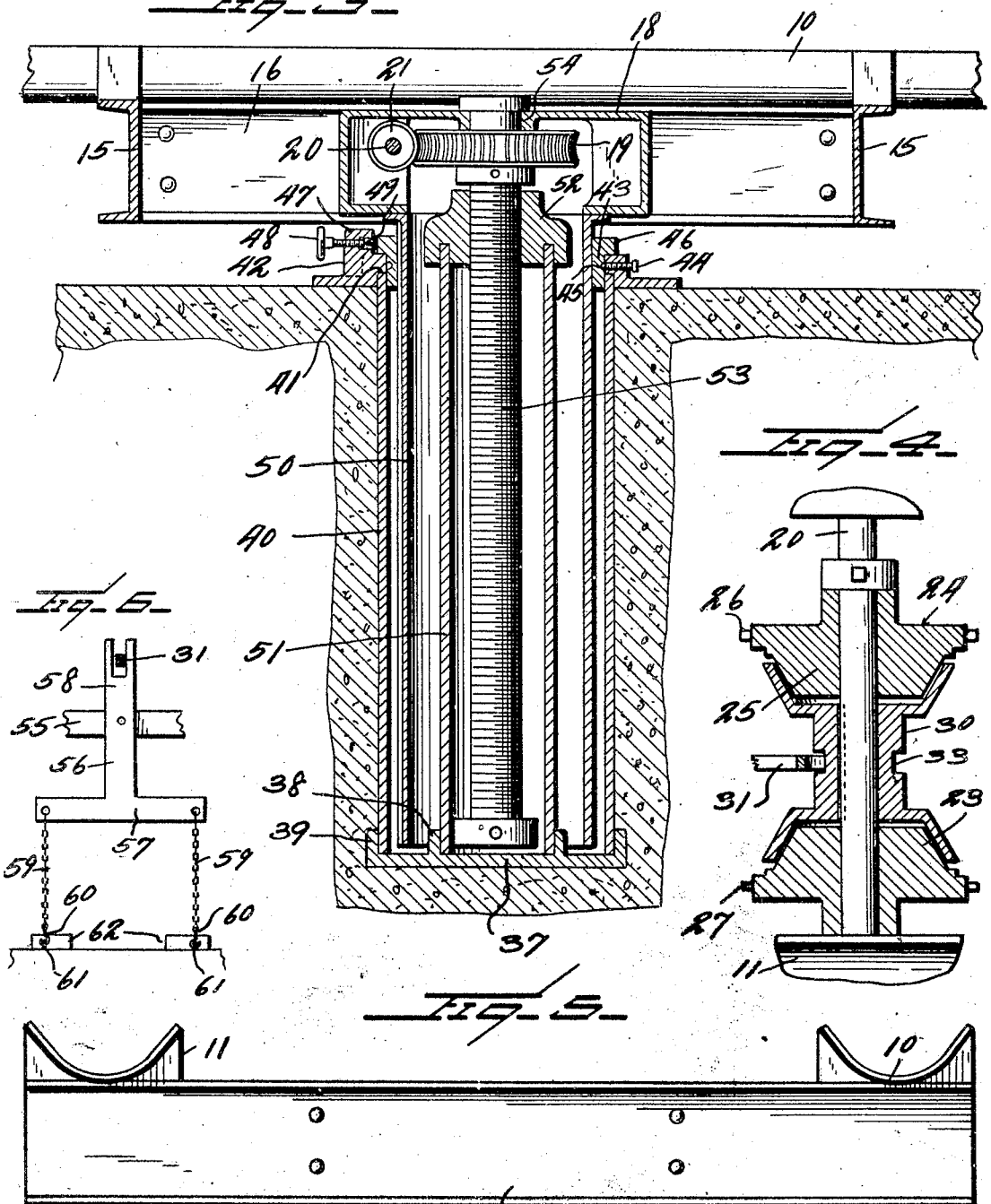

Patented May 18, 1926.

1,585,596

UNITED STATES PATENT OFFICE.

ALBERT C. MENGES, OF MEMPHIS, TENNESSEE, ASSIGNOR OF FORTY-NINE PER CENT TO C. C. MEDLEY, OF MEMPHIS, TENNESSEE.

COMBINED ELEVATOR AND TURNTABLE FOR VEHICLES.

Application filed September 30, 1925. Serial No. 59,691.

This invention relates to a combined elevator and turntable for vehicles and has for an important object thereof the provision of a device of this character which may be operated either by power provided by the vehicle or by a driving element carried by the elevator proper.

A further object of the invention is to provide in a device of this character means whereby the driving element employed may be readily disconnected from the drive manually or will be automatically disconnected from the drive when the elevator reaches a predetermined point during either raising or lowering operations.

A further object of the invention is to provide in a device of this character a structure which may be cheaply and at the same time strongly produced and which is readily installed at the point at which the tool is to be applied.

These and other objects I attain by the construction shown in the accompanying drawings, wherein for the purpose of illustration is shown a preferred embodiment of my invention and wherein:—

Figure 1 is a plan view of an elevator and turntable constructed in accordance with my invention, portions being broken away to illustrate the interior mechanism;

Figure 2 is a side elevation thereof;

Figure 3 is a sectional view on the line 3—3 of Figure 1;

Figure 4 is a detail sectional view showing the construction of a compound clutch element;

Figure 5 is an end elevation showing the track structure;

Figure 6 is a detail view showing the operating mechanism for automatically terminating the upward or downward movement of the elevator.

Referring now more particularly to the drawings, the numerals 10 and 11 indicate spaced track-ways adapted to receive wheels at the opposite sides of a vehicle, the track-way 11 having an opening 12 formed therein in which are mounted a pair of rollers to receive a drive wheel of the vehicle, one of these rollers having a shaft 13 extended through the track-wall and provided with a sprocket 14. The track-ways are connected by transverse frame elements 15 which are connected adjacent their centers by longitudinally extending frame members 16 and 17. The frame elements 16 and 17 provide a support or mounting for a casting 18.

This casting 18 affords a bearing for a worm gear 19 which abuts the under surface of the casting and likewise affords bearings for a shaft 20 having a worm 21 meshing with the worm gear 19. The outer end of the shaft 20 has applied thereto in alignment with the sprocket 14 the sprocket 22 of a combined sprocket and clutch element, the clutch of which is designated at 23. This shaft has also mounted thereon a similar applying sprocket and clutch element 24, the clutch 25 of which opposes the clutch 23 and the sprocket element 26 of which aligns with a sprocket 27 on the armature shaft 28 of a motor 29 suitably supported from the structure.

Between the clutch elements 23 and 25 and upon the shaft 20 is splined a double ended clutch element 30, one end of which is adapted for coaction with the clutch 23 while the opposite end of which is adapted for coaction with the clutch 25. In its intermediate position, this clutch element does not engage either of the clutch elements, 23, 25 and accordingly neither of the drives is connected with the shaft 20. Means for shifting the clutch 30 are provided in a lever 31 pivoted to a support 32, one end of which engages in a groove 33 formed in the double clutch element and the opposite end of which has a link extension 34 provided with a handle 35.

The structure above described is arranged above a circular pit 36 of such length that the ends of the tracks 10 and 11 project beyond the end walls of the pit. At the center of the pit an opening is formed, in the bottom of which is seated a casting 37 having upstanding co-axial circular flanges 38 and 39. Within the flange 39 engages a housing tube 40, the upper end of which projects slightly above the bottom of the pit and engages in a rabbet 41 formed in a rim casting 42. This rim casting forms a bearing for a ring 43 which is held against vertical displacement with relation to the bottom casting by set-screws 44 or the like engaging in an annular groove 45 formed in the outer surface of the ring, the set-screws projecting through the rim casting. This ring has an upper braking shoulder 46 opposing a lug 47 formed on the rim casting 42 and through which is adjustably directed the operating element 48 of a brake 49 for holding the ring against rotation.

Within this ring is splined a housing sleeve 50, the upper end of which is rigidly secured to the casting 18. It will be obvious that when the brake is set, the sleeve 50 and accordingly the casting 18 and the entire structure associated therewith is held against rotation. Seated within the flange 38 of the base casting is a skirt 51 having at its upper end a nut 52. Threaded through this nut is a shaft 53 journaled in the casting 18, as at 54, and secured to the worm gear 19. It will be seen that upon rotation of the worm gear, the entire framework will be elevated and in its elevation will draw upwardly the housing sleeve 50 so that a complete housing is provided at all times for the jack mechanism just described, preventing the entry of dirt or dust. It will also be seen that the framework including the brackets may be rotatably positioned as is found desirable at any elevation thereof.

Pivoted to a support 55 is the stem 56 of an inverted T-shaped lever, the head 57 of which normally parallels the ground. The stem 55 has its upper end forked, as at 58, to receive the lever 31 and in the neutral position of the lever 31, the normal position of the T-shaped lever is maintained. It will be obvious that if the lever 31 is shifted to one side or the other to cause one of the cone clutches to engage and thus perfect one of the drives, the lever head 57 will occupy an inclined position. With the ends of this lever head 57, I connect flexible elements 59, the ends of which are provided with hooks 60 or other means whereby they may be readily engaged with eyes 61 or other convenient means for attaching the same to the base of the pit 36. It will be obvious that these flexible elements, being of the same length, will, when the device has reached a predetermined height, check motion thereof by restoring the T-shaped lever to its normal position and accordingly disengaging the engaged clutch. The T-shaped lever is of such length that as the device lowers, if the head 57 is inclined, one end of the other of this head will engage the ground or a striking block 62 which will restore the lever to its normal position and neutralize the drive. It will, of course, be understood that in most instances, the combined turntable and hoist will be disposed in one position so that the flexible elements can be engaged with their associated points of attachment. If the device is commonly employed in a number of different and rotatively spaced positions, a plurality of sets of attaching elements may be provided. It is pointed out that when the table is elevated and the screw 48 is released, the structure will tend to turn so that it will automatically move to a second position properly aligning the vehicle carried by the structure with a desired unloading or loading point due to the fact that the thread of the screw acts as an inclined plane down which the nut tends to travel due to the great weight imposed thereon.

Since the device is obviously capable of a certain range of change and modification without materially departing from the spirit of the invention, I do not limit myself to the specific structure hereinbefore set forth except as hereinafter claimed.

I claim:—

1. In a device of the type described, a structure having means for deriving power from the drive wheels of a vehicle, a prime mover carried by the structure, a jack for elevating the structure, means for connecting the jack to either the power deriving means or the prime mover to be operated thereby and means automatically operating to disconnect a connected drive when the structure reaches a predetermined elevation.

2. In a device of the type described, a structure having means for deriving power from the drive wheels of a vehicle, a prime mover carried by the structure, a jack for elevating the structure, means for connecting the jack to either the power deriving means or the prime mover to be operated thereby and means automatically operating to disconnect a connected drive when the structure reaches a predetermined elevation in either elevating or lowering the structure.

3. In a device of the type described, a structure having means for deriving power from the drive wheels of a vehicle, a prime mover carried by the structure, a jack for elevating the structure, means for connecting the jack to either the power deriving means or the prime mover to be operated thereby, means automatically operating to disconnect a connected drive when the structure reaches a predetermined elevation including a clutch element shiftable to connect either of the drives with said jack, an operating lever therefor, a control element associated with the operating lever and in its normal position maintaining the lever in a position disconnecting the clutch element and means for moving said control element to its normal position upon arrival of the structure at a predetermined altitude.

4. In a combined jack and turntable for vehicles, a structure including vehicle receiving tracks, a jack structure engaged with the structure centrally thereof and including a hoisting shaft and a stationary nut through which the shaft is threaded and a housing sleeve preventing the entry of dirt and dust to said shaft during elevation of the structure and supported thereby.

5. In a combined jack and turntable for vehicles, a structure including vehicle receiving tracks, a jack structure engaged with the structure centrally thereof and including a hoisting shaft and a stationary nut through which the shaft is threaded, a housing sleeve preventing the entry of dirt and dust to said shaft during elevation of the structure and supported thereby, a casting, a ring rotatable in the casting and to which the sleeve is splined and means connecting the ring and casting for locking the ring against rotation with relation to the casting.

6. In a device of the type described, a vehicle supporting structure, a jack for elevating the structure, a shaft for operating the jack, means for rotating the shaft to operate the jack including a pair of members rotatably mounted upon the shaft and spaced from one another, a motor carried by the structure for driving one of the members, means for operatively connecting the other of the members with the driving wheels of a vehicle arranged upon the structure to be driven thereby and a single means for clutching either of said members to said shaft.

7. In a device of the type described, a vehicle supporting structure, a jack for elevating the structure, a shaft for operating the jack, means for rotating the shaft to operate the jack including a pair of members rotatably mounted upon the shaft and spaced from one another, a motor carried by the structure for driving one of the members, means for operatively connecting the other of the members with the driving wheels of a vehicle arranged upon the structure to be driven thereby, a single means for clutching either of said members to said shaft and in one position thereof disengaging both members and means for automatically moving said member to the last named position when the structure reaches a predetermined elevation in either lowering or elevating the structure.

In testimony whereof I hereunto affix my signature.

ALBERT C. MENGES.